G. R. NEBINGER.
Fruit Drier.
No. 56,982.
Patented Aug. 7, 1866.
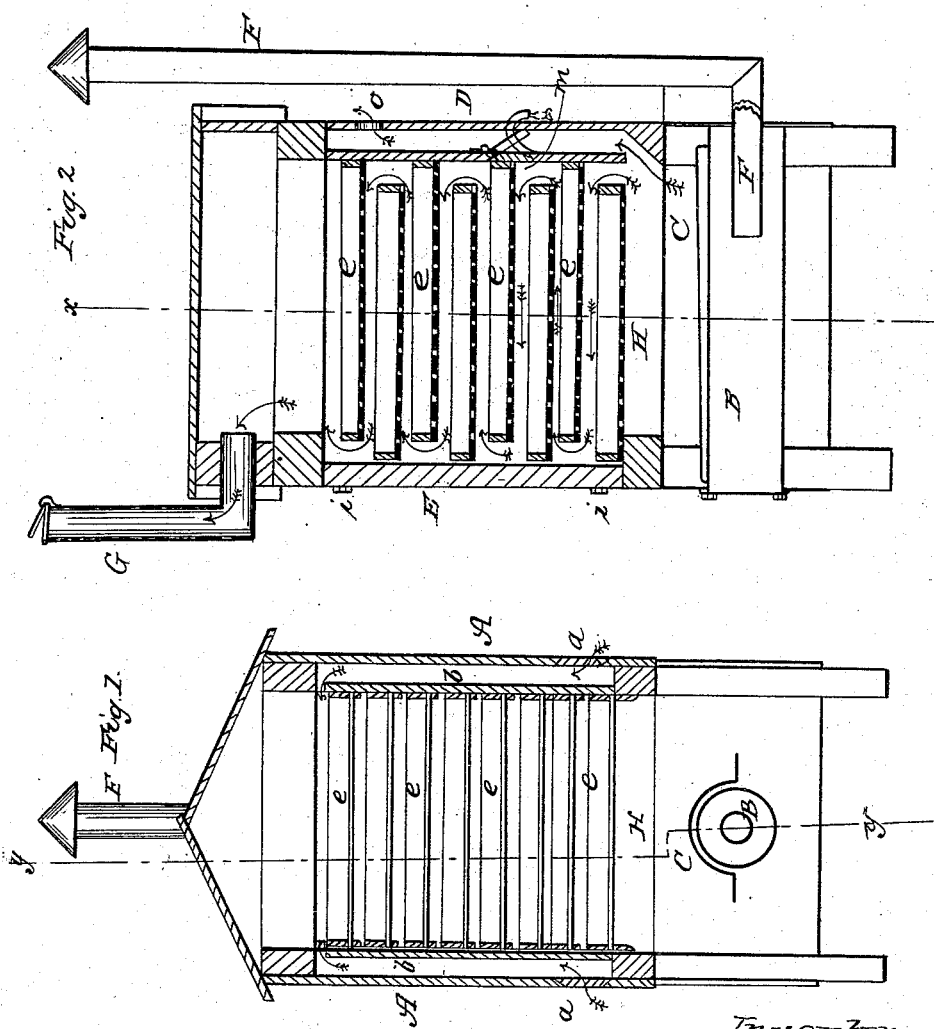

UNITED STATES PATENT OFFICE.

G. R. NEBINGER, OF LEWISBERRY, PENNSYLVANIA.

FRUIT-DRIER.

Specification forming part of Letters Patent No. 56,982, dated August 7, 1866.

*To all whom it may concern:*

Be it known that I, G. R. NEBINGER, of Lewisberry, in the county of York and State of Pennsylvania, have invented certain new and useful Improvements in Fruit-Driers; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use the invention, I will proceed to describe it.

My invention consists in constructing a house with a furnace located in its lower portion, with flues in the walls for the passage of the heated air, and provided with valves or doors for the admission of cold air and the escape of the hot air and moisture, for the purpose of drying fruit and similar articles.

Figure 1 is a vertical section taken on the line $x\ x$ of Fig. 2; and Fig. 2 is a vertical section taken on the line $y\ y$ of Fig. 1, the latter being at right angles to the former.

I construct a building of any required size, the lower portion being occupied by a furnace, B, as shown, the space surrounding the furnace being suitably inclosed to prevent the escape of the heat laterally, and causing it to ascend among and around the racks $e$, on which the fruit or substance to be dried is placed.

In order to prevent the heat rising in too great a quantity or intensity directly over the furnace a shield, C, is located directly over the furnace, of the form shown in Fig. 1, this shield having its rear end elevated, as shown in Fig. 2, whereby the heat is caused to flow out at the rear end, from whence it passes up around the rear end of the lower rack $e$; thence between the racks to the front, where it passes above the next rack, and thence to the rear again, and thus, following the course indicated by the red arrows, back and forth, from one end to the other of the room, alternately passing under and over all the racks successively, thereby being brought in direct contact with all the racks and their contents.

It will be observed that the racks $e$ are so arranged as to leave a space for the passage of the hot air alternately past their front and rear ends, as shown clearly in Fig. 2.

The rear wall, D, is made double, as shown in Fig. 2, and has an opening at the bottom to permit a portion of the hot air to enter the space. At $m$ a valve is hinged, which, when opened, as indicated in red, permits a portion of the hot air to enter the room at that point, and be thence distributed over the upper tiers of racks, which would otherwise be less heated than those nearer the furnace. One or more openings, $o$, is made in the outer wall to permit the escape of any surplus heat that may rise to that point, these openings being provided with valves for closing or regulating them, if desired.

In the side walls, A, near the bottom, an opening is made having a slide, $a$, fitted therein for the admission of cold or fresh air when deemed necessary, the air entering at these points finding its way into the interior by passing up the spaces or flues $b$ in the walls A, and entering the room at the top, as indicated by the arrows in Fig. 1.

In order to permit the escape of the moisture which escapes from the fruit, &c., in drying, a pipe, G, is provided, as shown in Fig. 2, this pipe having a valve, $n$, secured to its upper end, to prevent the entrance of rain and dust, and which is intended to or may be so arranged as to be opened by an increase of the temperature, and thus operate as a regulator to the temperature of the room.

It will be observed that the lower end of the smoke-pipe F is extended for some distance into the rear end of the furnace. This is done for the purpose of causing the heat generated in the furnace to be more effectually radiated and to prevent it from passing too readily out through the smoke-pipe.

By these means I am enabled to produce an apparatus that is simple, and that operates with great efficiency, and in which the heat can be controlled with ease.

Having thus described my invention, what I claim is—

1. A dry-house for fruit having the side walls made double, with an interior opening at the top and an adjustable exterior opening at the bottom, as shown in Fig. 1, in combination with the hollow rear wall, D, having the air-passages and valve *m*, arranged as shown in Fig. 2.

2. Arranging the racks *e* so as to form the passages for the hot air at the opposite ends alternately, for the purpose of causing it to pass both over and under all the racks, as set forth.

3. In combination with the racks *e*, arranged as shown and described, the furnace B, with the inclined shield C, when constructed and arranged to operate substantially as set forth.

4. The extension of the smoke-pipe F within the furnace B, as and for the purpose set forth.

G. R. NEBINGER.

Witnesses:
 C. MARKLEY,
 ADAM EARNEST.